(No Model.)

F. TRIER.
CUTTER FOR DRESSING STONE.

No. 296,252. Patented Apr. 1, 1884.

Witnesses:
T. C. Brecht
S. S. Ginsabaugh

Inventor:
Frank Trier
By S. W. Ginsabaugh
Attorney.

UNITED STATES PATENT OFFICE.

FRANK TRIER, OF LONDON, ENGLAND.

CUTTER FOR DRESSING STONE.

SPECIFICATION forming part of Letters Patent No. 296,252, dated April 1, 1884.

Application filed November 6, 1883. (No model.) Patented in England January 20, 1883, No. 341.

*To all whom it may concern:*

Be it known that I, FRANK TRIER, a subject of the Queen of Great Britain, residing at No. 19 Great George Street, Westminster, London, England, have invented certain new and useful Improvements in Cutters for Dressing Stone, of which the following is a specification, reference being had therein to the accompanying drawings.

My invention relates to the construction and arrangement of cutters for dressing stone and other material, for which I have obtained Letters Patent in England, No. 341, dated January 20, 1883.

The object of my present invention is to provide a cutter for dressing stone, or a series of conical cutters arranged on a common carrying-bar, and adapted to come in contact with the stone at varying depths, some to chip off the rough surface and others to dress and finish the stone.

My invention therefore consists in mounting on a common carrying bar or bolt a series of two or more concentric cone-shaped cutters adapted to be revolved together or independently of each other when brought in contact with the moving surface of the stone, as will more fully appear.

Figure 1:
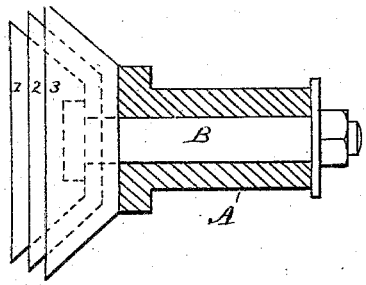
Figure 2:
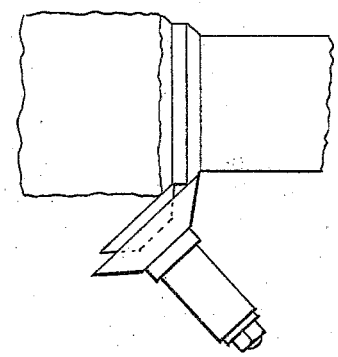
Figure 3:
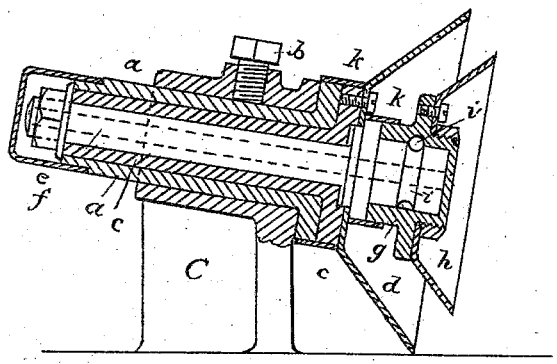
Figure 4:
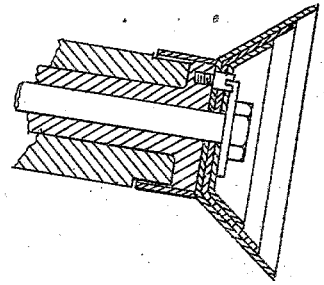

Figure 1 is a sectional view of three concentric cutters mounted on a shaft or bushing in such a manner as to revolve together. Fig. 2 is a plan view of two concentric cutters operating on a stone. Fig. 3 is a sectional view of two concentric cutters mounted on separate spindles and adapted to have separate and independent motions. Fig. 4 is a sectional view of a conical cutter strengthened by a series of concentric cones secured therein.

Referring to Fig 1, A is a bushing, to which is secured a series of concentric cutters, 1 2 3, by means of a central bolt, B. The bushing is mounted so as to rotate in an arm or chuck of any suitable construction, by which the cutters can be presented to the work at any desired cutting-angle. In this instance the concentric cutters revolve together and with the bushing, to which they are attached, when they come in contact with the moving surface of the stone. Two concentric cutters are shown as applied to the stone in Fig. 2.

In Fig. 3 I have shown two concentric cone-shaped cutters mounted on separate spindles and adapted to have separate and independent motions. I will now proceed to describe this arrangement of cutters in detail.

C is the holder or support, in which is secured the sleeve $a$, said sleeve being adjustable by means of a set-screw, $b$.

Fitted within the sleeve $a$ is a bushing, $c$, to which the cutter $d$ is attached. The bushing is held in the sleeve at one end by means of a washer, $e$, on the central cutter-bolt, $f$, and at the other end by means of its flanged or enlarged end. The cutter-bolt $f$ is enlarged and prolonged at its inner end, and forms a pivot for a second bushing, $g$, to which the cutter $h$ is secured in any suitable manner. The inner end of the bolt $f$ is grooved, as at $i$, and the inner surface of the bushing $g$ is provided with a similar groove, $i'$, which registers with the groove $i$, and forms a hole into which is placed a ring or segment of a ring to prevent the bushing $g$ from coming off of the bolt $f$.

It is obvious that when the cutters $d$ and $h$ are brought in contact with the moving face of the stone each will have a separate and independent rotary motion imparted to it by the frictional contact with the moving stone, and they will act to chip or dress the same.

$k$ $k$ are bands secured to the sleeve $a$ and rod $f$, to prevent the dust and grit from cutting the bearings of the bolt and bushing. Where the differences of the diameters of the concentric cutters are small, they may be bolted together, as in Fig. 1. Cutters thus arranged work best in conjunction with single cutters, the latter doing the bulk of the work in removing the superfluous material, the former being used to finish the operation.

In Fig. 4 I show a conical cutter strengthened by means of a series of concentric cones, all bolted together; but as this feature is embraced in a separate application for a patent, filed October 18, 1883, Serial No. 109,360, further reference to it is unnecessary.

I do not claim in this application a holder for cutters having an aperture for receiving the bushing of the cutter, and adapted to be turned in its seat to adjust the position of the cutter with relation to the stone, as this matter is embraced in application No. 110,969, filed of even date with this application.

I am aware that it is not new to arrange a series of cutter-disks on a common axis, each cutter being free to turn on said axis independently of the other when brought in contact with the stone or surface to be dressed, and such I do not claim.

Having thus described my invention, what I claim is—

1. A tool for cutting or dressing stone, consisting of a series of cone-shaped metallic cutters of different diameters, arranged one within or partially within, but not in contact with, the other, and mounted on a common axis, as set forth, whereby each cutter is adapted to act on the stone at a different depth from the others.

2. A tool for cutting or dressing stone, consisting of a series of cone-shaped metallic cutters of different diameters, arranged one within or partially within, but not in contact with, the other, mounted on a common axis, and adapted to be independently rotated in substantially the manner set forth.

In testimony whereof I affix my signature in presence of two witnesses.

FRANK TRIER.

Witnesses:
  Jo. Edw. Beesley,
  G. S. Purry,
*Both of 2 Pope's Head Alley, Cornhill, London, Gents.*